May 2, 1944.  L. YOST  2,348,046
BALL THRUST BEARING FOR WELL DRILLING UNITS
Filed May 1, 1941

Lloyd Yost
INVENTOR.
BY
ATTORNEY.

Patented May 2, 1944

2,348,046

UNITED STATES PATENT OFFICE 2,348,046

BALL THRUST BEARING FOR WELL DRILLING UNITS

Lloyd Yost, Los Angeles, Calif., assignor to A. O. Smith Corporation, Milwaukee, Wis., a corporation of New York Application May 1, 1941, Serial No. 391,335

3 Claims. (Cl. 308—4)

This invention relates to a ball thrust bearing for well drilling units, and has found particular application to units in which the drill is secured to the rotor of a mud turbine at the bottom of the well for driving the same.

Heretofore, in the development of turbine driven drills of this character, it had been assumed that the longitudinal thrust on the turbine shaft relative to its housing was dependent upon the weight of the drill tubing above and the formation being drilled, and that the control of the weight of the tubing string from the top of the well would eliminate trouble from excessive wear on the thrust bearings. It was also assumed that shock from end thrust came solely from the drill as it engaged different rocks and earth formations. Therefore, the upward thrust bearing was made strong to withstand the shocks and the downward thrust bearing was small and merely served to support the rotor and drill in pull out and against the downward flow of mud.

In research on this type of drill applicant has disproved these assumptions and the present invention is directed to the solution of certain problems arising from the fact that shock as to rotary load is transmitted to the mud driving the turbine in such a way as to create a hammer effect in the fluid, resulting in much larger downward thrust shock forces on the turine rotor than are normally applied upwardly by the drill.

The object of the invention is to provide a thrust bearing of longer life for rotors employed in turbine driven drills for drilling wells.

Another object is to provide such a thrust bearing of the ball bearing type in which the balls are rotated at slower speed and consequently have less wear from the mud than would the ordinary type of bearing.

Other objects will appear from the following description of a preferred embodiment of the invention illustrated in the accompanying drawing.

Figure 1:
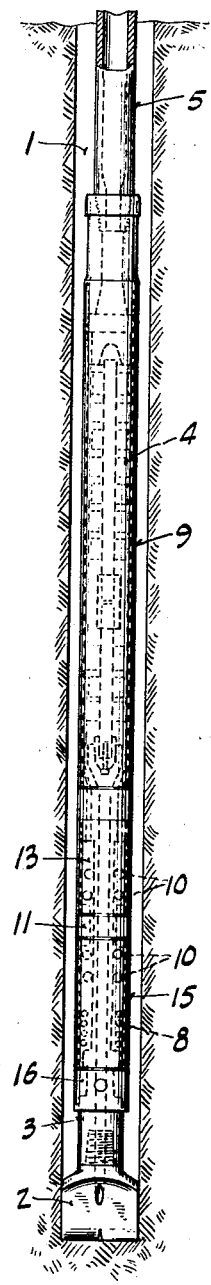
Figure 1 is a side elevation of the drilling equipment illustrated in a well which is sectioned for that purpose.
Figure 2:
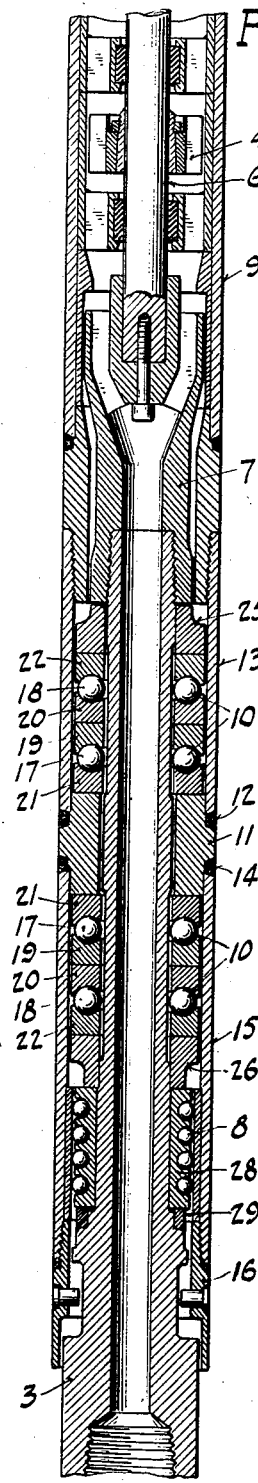
Fig. 2 is a vertical section through a part of the turbine and the lower bearings.
Figure 3:
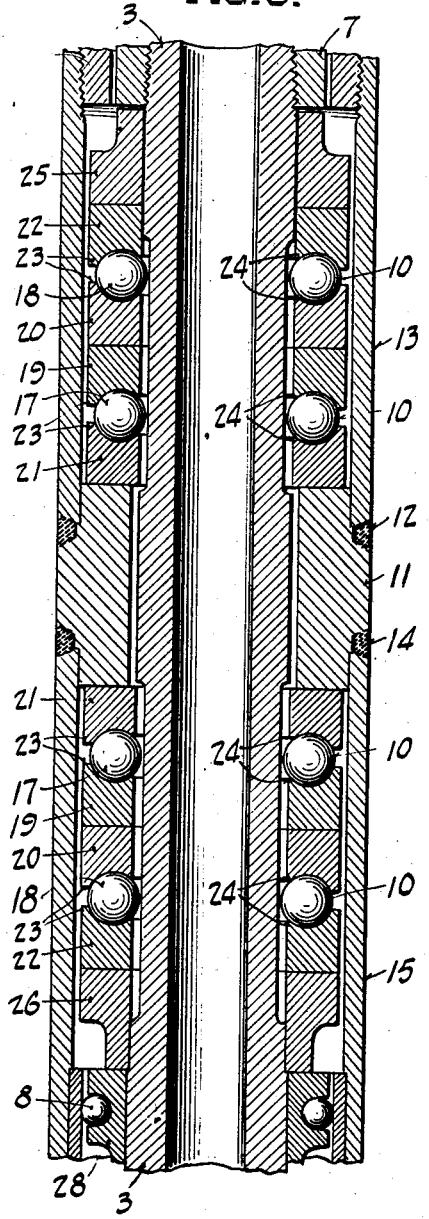
Fig. 3 is an enlarged vertical section through the thrust bearing alone.

The invention provides a strong downward thrust bearing as well as an upward thrust bearing.

In the drilling of a well 1, the drill 2 is directly secured to the lower end of a drill shaft 3 driven by the rotor of the turbine 4. The turbine is suspended in the well at the end of the drill tubing 5 which is held and fed from the top by the usual derrick equipment.

The drill shaft 3 constitutes an extension of the turbine rotor shaft 6 and is coupled thereto by an adapter or coupling member 7 which also serves to direct the mud exhausted from the turbine toward the center and into the hollow drill shaft.

The drill shaft 3 rotates in a radial bearing 8 in the end of casing 9 of the turbine, and in thrust bearings 10 adjacent the radial bearing.

The thrust bearing 10, which constitutes the principal feature of the present invention, comprises a central abutment ring 11 welded as at 12 to an upper bearing casing 13 and as at 14 to a similar lower bearing casing 15. The upper casing 13 is threaded onto the lower end of the turbine housing and contains the thrust bearing to oppose downward movement of the shaft 3 and rotor relative to the casing and housing. The lower casing 15 is threaded onto a safety end 16, the features of which constitute the subject matter of a co-pending application by the present applicant issued to Patent No. 2,301,105, on November 3, 1942. The lower casing 15 contains the thrust bearing for opposing upward thrust of the shaft 3 and rotor relative to the casing and housing.

Each thrust bearing comprises two independent sets of circumferentially arranged balls 17 and 18 separated by ball races 19 and 20, the smooth backs of which engage each other in a transverse plane enabling relative movement of the two. Opposing the race 19 is a complemental race 21 to cooperate with the balls 17 and opposing the race 20 is a complemental race 22 to cooperate with the balls 18.

The races 19, 20, 21 and 22 are all preferably spaced radially from both the shaft 3 and the respective casings 13 and 15 to allow freedom of radial movement with the balls as they rotate about the shaft. The races have grooves therein to accommodate the balls, the outer lip 23 of each race at the groove extending slightly farther longitudinally than the inner lip 24 to compensate for the wear caused by centrifugal action of the balls. The relatively short lip 24 on the inside of the groove gives freedom of rotation for the balls and reduces the wear on them.

The end races 21 bear against opposite sides of ring 11 and transmit the thrust forces thereto. The end races 22 bear against upper and lower thrust blocks 25 and 26, respectively. The upper block 25 is engaged by the end of adapter 7 while the lower block 26 is engaged by the radial bearing member 28 on shaft 3, the member 28 in turn engaging a ring 29 welded to the shaft.

By having the thrust bearings of the flat ball bearing type, it is possible to employ balls of relatively large diameter, having regard for the radial space available between the casing members and the shaft. Furthermore, inasmuch as the two sets of balls are in series the bearing normally functions with the balls rotating at lower speed than would be the case of a single set of balls. This is accomplished by providing the idler races 19 and 20 between the sets of balls and which tend to rotate at about half the speed of rotation of the shaft relative to the casing. Additional intermediate sets of balls might be provided to reduce the rotation differential between the races at each set still farther.

The invention may have various embodiments within the scope of the following claims.

I claim:

1. In an apparatus of the class described, a ball thrust bearing to withstand longitudinal thrust on a rotor element relative to a stationary element adjacent the same, comprising a plurality of sets of balls encircling said rotor in spaced relation, a plurality of separate idler races therebetween with the free backs of at least two of said races engaging each other in a transverse plane to provide for relative movement of the same, and end races engaging an abutment on said relatively stationary element and said rotor element, respectively.

2. In a well drilling unit in which the drill shaft is rotated directly by a fluid turbine rotor at the bottom of the well, an upward thrust bearing for preventing upward shocks transmitted to the rotor from the drill from injuring the turbine by moving the rotor upwardly relative to the stator, and a downward thrust bearing for preventing downward shocks applied to the rotor by a hammer effect in the motive fluid from injuring the turbine by moving the rotor downwardly relative to the stator, said upward and downward thrust bearings comprising a plurality of sets of balls separated by a plurality of ball races, the races of said bearings being radially spaced from both the drill shaft and casing to provide freedom of radial inward and outward movement of each of said races with the balls as the latter rotate about said shaft.

3. In a well drilling unit in which the drill is rotated directly by the rotor of a fluid turbine at the bottom of the well, a downward thrust bearing for preventing downward shocks applied to the rotor by a hammer effect in the motive fluid from injuring the turbine by moving the rotor downwardly relative to the stator, said bearing comprising a plurality of sets of balls operating in a plurality of separate circular races with said races disposed to surround the rotor and mounted for free lateral movement, the races between the sets of balls constituting free idler members with relative movement therebetween for reducing the speed of rotation of the balls and the wear on the same.

LLOYD YOST.